(12) United States Patent
Mankovskii (10) Patent No.: US 10,445,222 B2
(45) Date of Patent: Oct. 15, 2019

(54) DEBUGGING IN-CLOUD DISTRIBUTED CODE IN LIVE LOAD ENVIRONMENT

(71) Applicant: CA, INC., New York, NY (US)

(72) Inventor: Serguei Mankovskii, San Ramon, CA (US)

(73) Assignee: CA, INC., New York, NY (US)

( * ) Notice: Subject to any disclaimer, the term of this patent is extended or adjusted under 35 U.S.C. 154(b) by 0 days.

(21) Appl. No.: 16/130,924

(22) Filed: Sep. 13, 2018

(65) Prior Publication Data

US 2019/0026216 A1 Jan. 24, 2019

Related U.S. Application Data

(63) Continuation of application No. 15/010,308, filed on Jan. 29, 2016, now Pat. No. 10,114,732.

(51) Int. Cl.
G06F 9/44 (2018.01)
G06F 11/36 (2006.01)
H04L 29/08 (2006.01)

(52) U.S. Cl.
CPC ........ *G06F 11/3664* (2013.01); *G06F 11/362* (2013.01); *G06F 11/3648* (2013.01); *H04L 67/10* (2013.01)

(58) Field of Classification Search
None
See application file for complete search history.

(56) References Cited

U.S. PATENT DOCUMENTS

| 2010/0198938 A1* | 8/2010 | Molland | H04L 29/08846 709/217 |
| 2012/0102459 A1* | 4/2012 | Bates | G06F 11/362 717/124 |

OTHER PUBLICATIONS

Office Action dated Feb. 16, 2018 in U.S. Appl. No. 15/010,308.
Response to Office Action filed May 16, 2018 in U.S. Appl. No. 15/010,308.
Notice of Allowance and Fees Due dated Jun. 29, 2018 in U.S. Appl. No. 15/010,308.

\* cited by examiner

*Primary Examiner* — Qamrun Nahar
(74) *Attorney, Agent, or Firm* — Gilliam IP PLLC (57) ABSTRACT

A multi-device data processing machine system includes a plurality of network-connected cliental servers including first and second production servers coupled to a dynamic load balancer. The machine system also includes an SaaS development server that is configured to pass under-development process requests to the load balancer in combination with a mix command such that the load balancer routes a mix of routine production traffic and the under-development process requests to at least one of the production servers that is instrumented for enabling remote debugging of code executing therein so that the under-development process requests can be debugged under the full or partial stresses of a live production environment.

20 Claims, 4 Drawing Sheets

DEBUGGING IN-CLOUD DISTRIBUTED CODE IN LIVE LOAD ENVIRONMENT

This application is a continuation of and claims benefit of U.S. patent application Ser. No. 15/010,308, filed Jan. 29, 2016 and originally entitled "DEBUGGING IN-CLOUD DISTRIBUTED CODE IN LIVE LOAD ENVIRONMENT" where the disclosure of said application is incorporated herein by reference in its entirety.

FIELD OF DISCLOSURE

The present disclosure relates generally to enterprise wide resource performance monitoring, management and debugging. More specifically it relates to machine-implemented methods for performing debugging of in-cloud distributed code while the associated resources are subject to a live load environment.

DESCRIPTION OF RELATED TECHNOLOGY

Large enterprises (e.g., business organizations) typically employ cloud-based data processing systems and outside support entities (sometimes referred to as SaaS providers, where SaaS refers to Software-As-A-Service) for handling the day-to-day details of managing their enterprise wide, cloud based software and hardware resources. This frees employees of the business or other enterprise to focus on their core mission (e.g., core business goals) rather than expending their energies on managing all detailed aspects of enterprise wide software and hardware resources. SaaS responsibilities may include assuring that sufficient resources are available for efficiently handling customer load demands and assuring that the software and hardware resources are operating without error (e.g., free of bugs).

By way of a hypothetical example, consider a large business enterprise; say, an online books-and-other products selling company fictitiously called Amazem.com. It's core business is selling books-and-other products by way of the Internet and making sure its customers are satisfied and come back for repeat business. Amazem.com may rely on a large scale "cloud" computing environment for delivering to its customers and to its customer support personnel a variety of always-on web services and tools. As those skilled in the art of cloud computing will appreciate, a "cloud" may be implemented as a geographically distributed and network interconnected array of physical data processing servers (hereafter also "cliental servers") that often host reconfigurable "virtual" servers and "virtual" software modules as well as "virtual"—and thus reconfigurable—communication capabilities. As a consequence, the in-cloud data processing includes executable code that is distributed across a plurality of virtual and/or real servers. Debugging of such code may call for identifying its location and then copying it into an isolated debugging environment for further work on the potentially bug-infected code.

When kept bug free, and appropriately implemented and maintained, the "cloud" appears to operate as a relatively seamless and crash-proof mesh of hot-plug wise replaceable servers, storage units, communication units and the like. Ideally, point failures of specific physical units within a physical layer of the cloud or of specific virtual units within the supported virtual layers will be automatically and almost instantly repaired by shifting the supported virtual functionalities to spare other support portions of the physical and/or virtual layers. Part of this shifting is referred to as load balancing and is performed by so-called, load balancers.

Because of sheer size of the cloud and also because of the constantly shifting and self-reconfiguring fabric of resources, it can be very difficult to spot, localize and repair or prevent problems, such as for example those related to load management as between competing customer demands for service, including execution threads that interfere with one another. Thus large enterprises (e.g., the fictitious Amazem.com) typically outsource the task of detailed cloud maintenance and debugging to offsite, SaaS resource management providers to watch (monitor) their hardware and software systems for them and to proactively manage them (e.g., spot and debug or otherwise alleviate problems prospectively or proactively) so as to keep the data processing/communications portions of the business running smoothly without loss or degradation of service to end-use customers. In this way the business enterprise can focus on its core business and keep its customers (end-users) happy.

In order to carry out their delegated tasks, SaaS resource management providers may install POP (Point of Presence) agent software modules and/or simpler forms of local performance monitoring services into all the physical servers of their cliental (e.g., the cloud based online business enterprise). In one set of embodiments, POP agent modules provide bytecode inserted instrumentation of main code over which the POP agents keep watch or on which the POP agents can operate. More specifically, one class of such POP agent modules may be customized for monitoring of performance of on-site software and hardware during live handling of customer transaction sessions (e.g., where each customer of the online book store is searching for or buying books) and or changing of local server settings. An alternative and simpler option is that of using local performance monitoring services where these embed into the server code, localized and automated Internet calls that message pre-specified URL's and attach monitoring reports to those URL calls. When a performance or other issue is spotted by an onsite (POP) monitoring agent and/or other monitoring means and debugging is required, the debugging of the spotted problem is conventionally performed on a separate debug system that merely mimics resource loading rather than experiencing the actual loading present in a live production environment where live handling of a large number of customer transaction sessions may be occurring. As a result, the separate debug system may not accurately model the live production environment and may miss faults or failures that are present only in the live production environment and not in the isolated debugging environment.

It is to be understood that this background of the technology section is intended to provide useful background for understanding the here disclosed technology and as such, this technology background section may include ideas, concepts or recognitions that were not part of what was known or appreciated by those skilled in the pertinent art prior to corresponding invention dates of subject matter disclosed herein.

SUMMARY

Structures and methods are provided in accordance with the present disclosure for enabling debugging of under-development processes in a live production environment.

In accordance with one aspect of the present disclosure, a dynamic load balancer is configured to automatically distinguish between routine production traffic and transaction requests sourced from a development and debugging server. The load balancer automatically routes a mix of both routine production traffic and transaction requests of an under-development process to at least one production server. That at least one production server is instrumented to provide for both remote debugging of code executing therein and performance reporting on production transactions handled by that production server. Thus interaction of under-development process code with routine handling of production traffic can be observed in a live production environment and corrected for with use of installed debugging tools.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
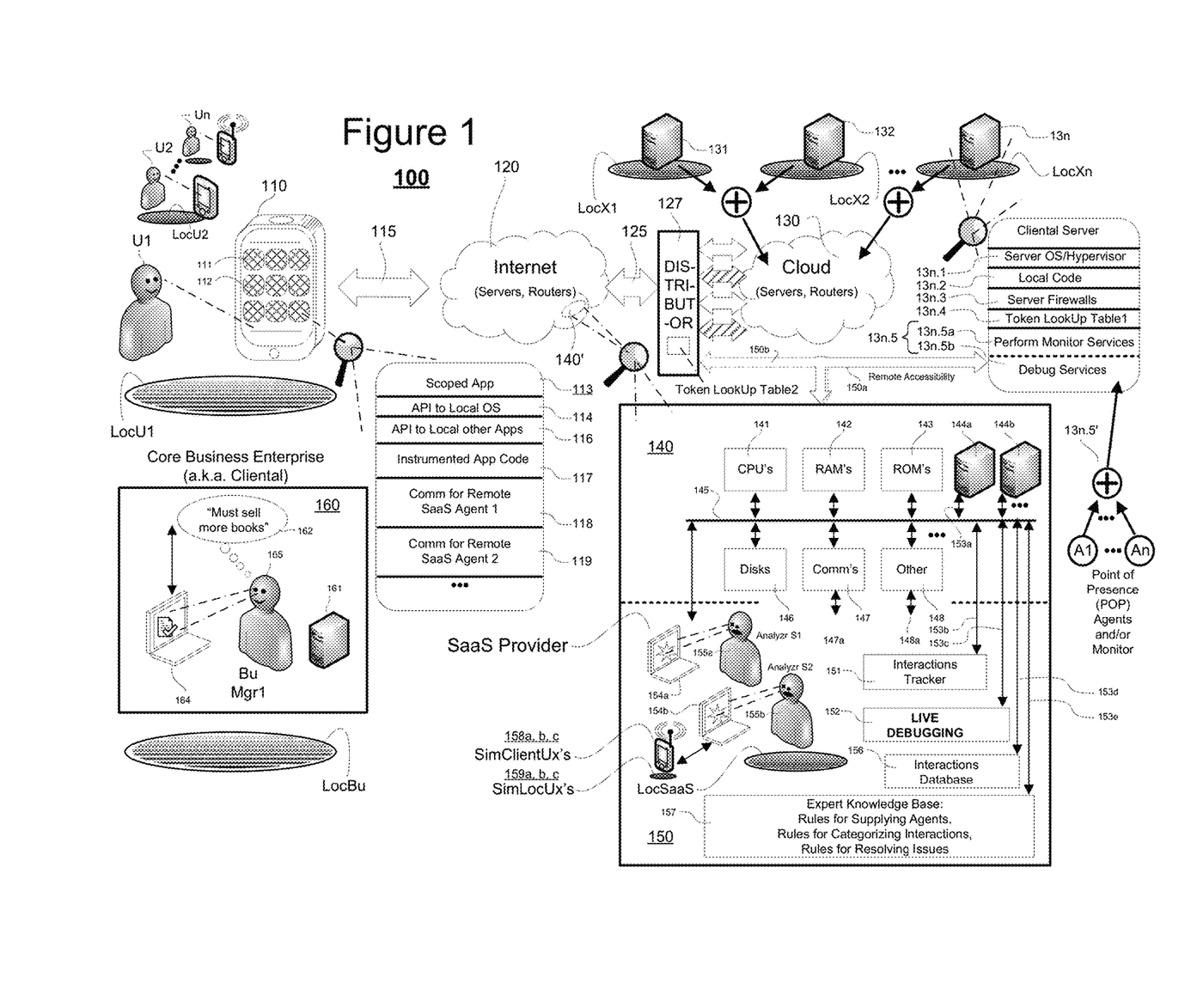
FIG. 1 is a block diagram schematically showing an interconnected multi-device enterprise system into which an SaaS provider has installed POP (Point of Presence) agent software modules and/or other local performance monitoring means into all or most physical data processing units (e.g., servers) of an SaaS serviced enterprise so that the SaaS provider can remotely monitor system performance and/or remotely debug executing code within a live production environment.

FIG. 1 is a block diagram showing an integrated client-server/internet/cloud system 100 (or more generically, an integrated multi-device system 100) to which the here disclosed technology may be applied. System 100 may also be referred to as an SaaS serviced, distributed resources, machine system in which there are provided a variety of differently-located data processing and data communication mechanisms including for example, customer-sited units (e.g., wireless smartphone 110) configured to allow end-users thereof (e.g., U1) to request from respective end-user occupied locations (e.g., LocU1) services from differently located enterprise hosts (e.g., in-cloud servers 131, 132, . . . 13n having respective siting locations LocX1, LocX2, . . . LocXn). There is further provided an enterprise resources monitoring, managing and debugging center (SaaS 150) tasked with the job of monitoring all mission-vital points within the system 100, with the job of managing corresponding hardware and software portions so that pre-specified goals of an end-users servicing enterprise (160, also 'cliental' of the SaaS) can be realized without any undue interruptions in service and achievement of those goals. The SaaS providing center 150 may, in one embodiment, provide software and/or hardware performance monitoring and live production debugging services.

It is to be understood that the illustrated system 100 is merely exemplary. As indicated, it comprises at least a few, but more typically a very large number (e.g., thousands) of end-user devices 110 (only a few shown in the form of wireless smartphones but understood to represent many similarly situated mobile and/or stationary client machines—including the smartphone wireless client kinds and cable-connected desktop kinds). These end-user devices 110 are capable of originating service requests (as part of live customer transaction sessions) which requests are ultimately forwarded to service-providing host machines (e.g., in-cloud servers 131, 132, . . . 13n) distributed within a cloud environment. Results from the service-providing host machines are thereafter typically returned to the end-user devices 110 and displayed or otherwise communicated to the end-users (e.g., U1, U2, . . . , Un). For example, if the business enterprise 160 is an online book selling one, the end-user (U1) may have installed on his/her smartphone (110) a software application ("app") that, with or without pre-registration, automatically requests from the enterprise, a list of new books that may be of current interest to the end-user (U1). In response to the request, enterprise software and hardware modules automatically identify the user, pull up a user profile, search for matching new books, and then within a very short time (e.g., a minute or often much less), communicate back the list for almost instant playout on the end-user's device 110. The end-user may then click on one of the offered selections and instantly purchase the book.

Aside from the end-user devices (e.g., 110) and the cloud servers (e.g., 131, 132, . . . , 13n) the system 100 comprises: one or more wired and/or wireless communication fabrics 115 (only one shown in the form of a wireless bidirectional interconnect) that couples the end-user client(s) 110 to networked servers 120 (not explicitly shown, and can be part of an Intranet or the Internet) where the latter may operatively couple by way of further wired and/or wireless communication fabrics 125 (not explicitly shown) to further networked servers 130 (e.g., 131, 132, . . . 13n).

The second set of networked servers 130 is depicted as being part of a "cloud" 130 for the purpose of indicating a nebulous and constantly shifting, evolving set of hardware, firmware and software resources. A front end portion of the cloud 130 typically includes one or more so-called, dynamic load balancers or traffic distributors (only one shown) 127. These traffic distributors (e.g., 127) are generally configured to distribute incoming service requests (125) to different resources of the cloud 130 so as to make efficient use of those resources. The resources within the cloud 130 (including the dynamic load balancers 127—only one shown) are typically used by large scale enterprise operations (e.g., core business enterprise 160) for the purpose of keeping mission critical tasks going without undue interruptions and while at the same time making efficient use of available resources. As those skilled in the art of cloud computing may appreciate, the "cloud" 130 may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by automatically shifting the supported virtual resources to spare other support areas in the physical layer. Because of sheer size and also the constantly shifting and self-reconfiguring fabric of resources, it can be very difficult to monitor and manage all the hardware and software resources of the system 100 and pinpoint where problems are present or emerging. The latter task is often delegated to an SaaS services provider (e.g., 150). In one class of embodiments, at least some of the traffic distributors 127 (only one shown) dynamically distribute their respective traffic streams (125) based on URL's (universal resource locators) embedded in those streams and on transaction correlating tokens. For example, a service request may be routed to one kind of real or virtual server if the underlying transaction purpose is that of searching for a specified type of book (and that purpose is indicated in an embedded URL, directed for example to the web site, Amazem.com/FindBooks/AndroidServices.js) while on the other hand, the service request may be routed to another kind of real or virtual server if the underlying transaction purpose is that of buying one or more pre-specified books (and that purpose is indicated in an embedded URL, directed for example to the web site, Amazem.com/PurchaseBooks/AppleiOSServices.js). The further but optional transaction correlating tokens may indicate who the end user is and which transaction of his or hers is being handled by a respective execution thread.

Still referring to FIG. 1, a quick and introductory walk through is provided here so that readers may appreciate the bird's eye lay of the land, so to speak. Item 111 represents a first user-activatable software application (first mobile app) that may be launched from within the exemplary mobile client 110 (e.g., a smartphone, but could instead be a tablet, a laptop, a wearable computing device; i.e. smartwatch or other). Item 112 represents a second such user-activatable software application (second mobile app) and generally there are many more. Each end-user installed application (e.g., 111, 113) can come in the form of non-transiently recorded digital code (i.e. object code or source code) that is defined and stored in a memory for instructing a target class of data processing units to perform in accordance with end-user-side defined application programs ('mobile apps' for short) as well as to cooperate with Internet/Cloud side applications implemented on the other side of communications links 115 and/or 125. Each app (e.g., 111, 112) may come from a different business or other enterprise (e.g., 160, only one shown) and may require the assistance of various and different online resources (e.g., Internet, Intranet and/or cloud computing resources). Generally, each enterprise is responsible for maintaining in good operating order its portions of the (e.g., Internet, Intranet and/or cloud computing resources). For sake of simplicity it is assumed here that there is just one enterprise 160 and that it has hired just one SaaS provider 150 to manage all of its online resources. In the more practical world, plural business or other enterprises can pool parts of their resources into a common core of resources that are watched over by a single SaaS provider 150 so as to reduce operating costs and maximize efficiency. In one embodiment, transaction correlating tokens are used to keep track of which process belongs to which end user (e.g., U1) and which app instance (e.g., 111 as launched at time t1) and which app originator (e.g., 160).

One example of a first mobile app (e.g., 111) could be one that has been designed to serve as an enterprise-wide customer support service (and/or support for other forms of recipient-targeting communications, e.g., collaborative project support software). In one example, a particular business organization (e.g., Chain #1 Online Book Stores) may wish to encourage a useful flow of information (e.g., which books are best sellers?, who has more in stock?, etc.) between its personnel and customers so as to increase sales. It is important that the utilized online resources remain working at all times and for as many customer-occupied locations (e.g., LocU1) as possible. More specifically, smartphone 110 may rely on a cellular telephony service providing portion of communications fabric 115 where communications capabilities may be limited in certain remote locations. It may be beneficial for the app provider/supporter (e.g., enterprise 160 and/or SaaS provider 150) to know that and to custom tailor how the app operates when used at different end-user locations (e.g., LocU1, LocU2) so that each end-user has a satisfactory experience with use of each transaction session launched through the respective app.

In one embodiment, one or more of the mobile apps are instrumented (for example with bytecode inserted instrumentation) so that in the background they provide useful quality control data that can be picked up by the SaaS provider 150 for monitoring performance, where pickup of the quality control data may occur at different locations (e.g., LocX1, LocX2, . . . , LocXn) throughout the enterprise. An example of an instrumented or 'scoped app' is depicted at 113. It includes an API interface 114 to the local operating system (e.g., Apple iOS™ or Android™). It may include further API's 116 to other local apps. It may further include instrumented execution code 117 where the instrumented part causes various pieces of meta-data to be embedded in the back and forth communication packets of the device 110. Examples of such embedded meta-data may include indications of time of service-request, complexity/size of service-request, location where service-request was launched from, type of local OS, ID of cellular carrier and so forth. This embedded meta-data is picked up by backend enterprise servers and by monitoring agents thereof (e.g., POP agents A1-An at 13$n$.5 or alternative other performance monitoring means) which are embedded in the backend enterprise servers. The picked up meta-data may be used for determining system performance (for example, how long did it take from time of end-user request to complete the requested service?). In more detail, some of the embedded meta-data may be targeted for use by a first SaaS backend monitoring agent as indicated at 118 and some targeted for use by a second SaaS backend monitoring agent as indicated at 119.

Mobile apps (e.g., 113), mobile operating systems (see 114), end-user devices (e.g., 110) and communication modalities (e.g., 115) are constantly changing, meaning that SaaS providers (e.g., 150) need to be constantly updating their installed agents (e.g., 13.$n$5' and/or other monitoring means), adding new ones into backend servers 120/130 and; due to constant growth of business needs, adding new cliental servers and installing fresh and updatable agents/ monitors into those as well. As such continuing change occurs, new or previously undetected "bugs" may crop up in the software, firmware and/or hardware, for example those added to deal with a new version app or OS. These added-in or substituted-in resources may need to be debugged with use of various software development tools including those that set breakpoints and trap points within executable code so as to on-the-fly catch bug-infected instances of code and/or informational data. The present disclosure provides methods and systems for performing on-the-fly debugging within a live productions environment which is subject to real time live transaction demands.

Typically, large systems such as 100 are subdivided into management-defined "sections". The size and resources inventory of each section (one example indicated at 140') is left to mangers of the system, but generally each section; where detailed portion 140 is used here as an example of a system section, includes a limited number of intercoupled, "local" resources such as one or more local data processing units (e.g., CPU's 141), one or more local data storage units (e.g., RAM's 142, ROM's 143, Disks 146), one or more local data communication units (e.g., COMM units 147), and a local backbone (e.g., local bus 145) that operatively couples them together as well as optionally coupling them to yet further ones of local resources 148. The other local resources 148 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 154*a,b*) and so on.

It is to be understood that various ones of the merely exemplary and illustrated, "local" resource units (e.g., 141-148) may include or may be differentiated into more refined kinds. For example, the local CPU's (only one shown as 141) may include single core, multicore and integrated-with-GPU kinds. The local storage units (e.g., 142, 143, 146) may include high speed SRAM, DRAM kinds as well as configured for reprogrammable, nonvolatile solid state data storage (SSD) and/or magnetic and/or other phase change kinds. The local communication-implementing units (only one shown as 147) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 148) may operatively couple to various external electromagnetic or other linkages 148*a* and typically operate in accordance with various ones of predetermined operating protocols. Additionally, various kinds of local software and/or firmware may be operatively installed in one or more of the local storage units (e.g., 142, 143, 146) for execution by the local data processing units (e.g., 141) and for operative interaction with one another. The various kinds of local software and/or firmware may include different operating systems (OS's), various security features (e.g., firewalls), different networking programs (e.g., web browsers), different application programs (e.g., word processing, emailing, spreadsheet, databases, etc.) and so on. A further example of such locally installed software and/or firmware units is shown in the magnification for in-cloud server 13*n*, where that server 13*n* includes a respective server OS/Hypervisor 13*n*.1 operatively installed therein and respective server security fences (e.g., firewalls) 13*n*.3 operatively installed therein. Not explicitly shown but also operatively installed in a behind-the-security-fences area 13*n*.2 of the server 13*n* along with other executable code is an operative browser (e.g., a web browser) that is configured to cooperatively interact with the local OS/Hypervisor 13*n*.1 and with local network communication resources (not shown, see instead 147 of section 140). In one class of embodiments, the installed browser is provided with an ability to access hardware and software resources outside of the normal browser "sandbox" so that the browser, if appropriately instrumented, can provide for remote monitoring and management (e.g., including debugging) of the behaviors of local hardware and software resources of the server 13*n* to remotely located SaaS personnel and their equipment (shown in lower portion 150 of the sample box shared with system section 140). Area 13*n*.2 further includes virtual code (not separately shown) configured to carry out various transactional services as requested by other components of the illustrated enterprise system 100. Service requests may originate from end user client devices such as smartphone 110 or from anywhere else in the system 100. More specifically, server 13*n* may be a "back end" server to which so-called, front-end servers delegate wholes or selected portions of their respective tasks (e.g., with attached transaction correlating tokens for keeping track of which process belongs to which parties and/or instantiated transaction processes). By delegating tasks to a variable array of back end servers, front-end servers may create the appearance of having greater data processing capacity and speed than they actually have.

When new or modified code is added to, or substituted into respective code areas like 13*n*.2 of respective front-end (e.g., in 120) or back-end (e.g., in 130) or more generally any data processing unit(s) (e.g., 131, 132, . . . , 13*n*) within the enterprise system 100 it may become desirable to debug that new code. The debugging process may include installing the new code, instantiating one or more execution threads that use that code, placing breakpoints in one or more of the launched threads, waiting for the breakpoints to trip (e.g., detecting that they have tripped), inspecting data values present after the breakpoints have tripped, modifying data values to see how those affect execution behavior, optionally stepping through use of the code by a respective instantiated thread step-by-step or letting the thread execute through to a next breakpoint and so on. If the debugging process indicates that the code needs to be modified, then the process is repeated by installing the modified code (including link time identifications of which additional pieces of local code are to be tied in), again instantiating one or more execution threads that use the code (and its link-time additions), checking for execution stops/pauses at preset breakpoints, inspecting machine states at those breakpoints and so on. The present disclosure provide methods for deploying new or changed code in live production environments, directing production loads to specific ones of respective servers having that new or changed code installed in them and then running debugging sessions on the new/changed code processes while the respective servers are subject to full or partial live production loads. Further details are provided below.

The expected "normal" behaviors for various local resources in each system section, for example units 141-148 of local section 140 are defined by system planning managers of the system 100. Typically they do not envisage and plan for viral waves of section stressing service requests (e.g., from the hundreds or thousands of mobile devices 110 of the mobile end-users (e.g., U1, U2, . . . , Un). Nor do they expect that executable code of one execution thread will interfere with that of another execution thread. However, the unexpected can and does happen; sometimes for example due to incompatibility of link time loaded library functions. SaaS providers (150) want to be able proactively or retrospectively deal with such problematic events by way of predictive modeling and ex post facto debugging. To prospectively ward off catastrophic failures of enterprise critical resources, the SaaS provider (e.g., 150) will embed into basically every cliental server (e.g., 131-13*n*) or at least a good number of them, resource monitoring and managing software such as Point of Presence (POP) agents (e.g., A1, A1, A3, . . . , Am) which can operate as local monitoring and change implementing agents. Such POP monitoring agents can allow a remotely located SaaS analyzer (e.g., 155*a*) to spot emerging problems (represented by the star burst on the screen of terminal 154*a*) and to try and mitigate them without having to be physically present at the location (e.g., LocX1, LocX2, . . . , LocXn) of every server. It is to be understood that the illustrated Point of Presence (POP) monitoring and parameter accessing agents may be replaced by simpler local performance monitoring means such as automated URL-calling reporters. It is to be understood that the illustrated human analyzer 155*a* can be replaced by an automated analyzer which relies for example on an expert ruled knowledge database 157 for among other things, accessing over-time developed rules (e.g., heuristically developed rules) for resolving different issues within the monitored system 100. To have such ability to remotely access cliential server hardware and software for purpose of monitoring and managing the same (where remote access capabilities are schematically represented as 150) the SaaS provider must somehow operatively install its POP agents (e.g., A1, A1, A3, . . . , A{m}, . . . , An) and/or other forms of performance monitoring means into a region like 13n.5 which is inside the security fences 13n.3 of the server and the provider 150 must somehow cause the POP agents (e.g., A1-An) and/or other forms of performance monitoring means to be cooperatively interoperative with the local operating system (e.g., OS/Hypervisor 13n.1) and to have monitoring and/or managing access to various hardware and software resources within the remote cliential server 13n. Although not yet detailed here, in accordance with one aspect of the present disclosure the installed set of POP agents A1-An and/or other forms of performance monitoring means includes a first set (e.g., A1-Am) configured to provide localized performance monitoring services (13n.5a) and a second set (e.g., Am-An) configured to provide localized debugging services (13n.5b) even in a live load environment. It is to be understood that the Point of Presence (POP) monitoring and parameter accessing agents may be replaced by simpler local performance monitoring means such as automated URL-calling reporters that send their performance reporting data to pre-specified URL's.

Installation of such POP agents and/or simpler local performance monitoring means (e.g., automated URL-calling reporters) can be carried out in a variety of ways. In one embodiment, a service technician is dispatched to the physical location (e.g., LocXn) of each server (e.g., 131-131n) to manually "install" each of the desired or additional POP agents (e.g., Am-An) and/or other local performance monitoring means, where the installed agents/monitoring means are cooperative with the specific and local Operating System and/or Hypervisor (e.g., 13n.1) of each server while at the same time bypassing various security fences (e.g., firewalls 13n.3) present at that installation site so as to be able to monitor or otherwise interact with the there executing code 13n.2. In an alternate embodiment, such POP agents and/or other local performance monitoring means can be installed by use of the pre-installed browser generally present in most servers where the browser are empowered to at least partially operate outside their sandboxes. Such browser based installation is not part of the present disclosure of invention and is mentioned merely as an alternate way of installing POP agents and/or other local performance monitoring means and/or debug enabling means. It is to be understood that every installation site can have a variety of different OS'es (e.g., Linux™, Unix™, Microsoft Windows™, Apple iOS™, etc.) in use and a variety of different security fences. A pre-installed browser can be configured to allow for limited bypass of those security fences and for smooth integration with the locally extant operating system(s).

In accordance with one aspect the present disclosure, remote production servers (e.g., 13n) can each be provided with a so-called, correlator token lookup table (LUT1) 13n.4 which provides at least for lookup of a production versus debugging attribute for each process correlator token (not shown) associated with its corresponding execution thread or instantiated process. When a front end user such as U1 launches a front end application (e.g., 111), that user is often automatically presented with a session log-in page. Part of the session log-in procedure typically assigns a unique transaction correlation token to that session. In one class of embodiments the unique correlation token is a 16 digit or bit hash of one or more pre-specified identifiers. The server token lookup tables (13n.4 or LUT1's) provide for automated lookup of specific correlation tokens and for association of those looked up tokens with classes of library functions that are to be installed at link time when transaction sessions having the specific correlation tokens are instantiated in the respective servers (e.g., 13.n). In accordance with the present disclosure, the server token lookup tables (LUT1's) also provide an indication of whether a to-be instantiated process is a production process or a debugging process. If a debugging process, then special debugging enabling library functions are referenced and added at link time to allow for remote debugging of those processes whose correlator tokens indicate them to be debugging processes. It is within the contemplation of the present disclosure that alternatively, an SaaS analyzer (e.g., 155b) may directly create his/her own correlator token for an analyzer-initiated transaction and then copy that analyzer created correlator token with its associated debugging attributes into one or more first token lookup tables (LUT1's) in desired servers and also, as will be detailed below into second token lookup tables (LUT2's) in corresponding load distributors (e.g., 127). In the case of the load distributors, as shall be seen below, the associated attributes of the correlator token include those that cause the load distributor 127 to route service requests that are tagged for remote debugging to specific ones of local servers (e.g., 23n of FIG. 2) where those specific ones of local servers have performance monitoring and/or debug enabling processes executing in them.

In accordance with another aspect the present disclosure, the SaaS provider sections (e.g., 150) are provisioned with remote access capabilities including access 150a to the remotely embedded POP agents and/or other performance monitoring services 13n.5b that allow for remote observation of, and remote debugging of remotely located, pre-instrumented code 13n.2 and allow remote access 150b to remotely located traffic load distributors (e.g., dynamic load balancers) such as the one shown at 127. The traffic load distributors (e.g., 127) are modified such that remote access 150b to each (only one distributor shown) can control how and to where the traffic load distributor 127 will distribute at least some of the service requesting traffic 125 it receives from elsewhere within the distributed system 100. In one embodiment, client devices U1-Un such as mobile cell phones 110 couple to so-called, front-end servers in system portion 120 and the front-end servers delegate the tasks of responding to received service requests to so-called, back-end servers (e.g., 13n) which are included for example as part of the cloud 130. In one class of embodiments, most traffic load distributors 127 include a second token lookup table (LUT2) for controlling how incoming process request traffic is to be distributed to downstream resources. The second token lookup tables (LUT2's) may be configured to recognize some correlator tokens as special ones (e.g., debugging ones) and to route the corresponding traffic to pre-specified, debuggable servers (e.g., 23n of FIG. 2).

Figure 2:
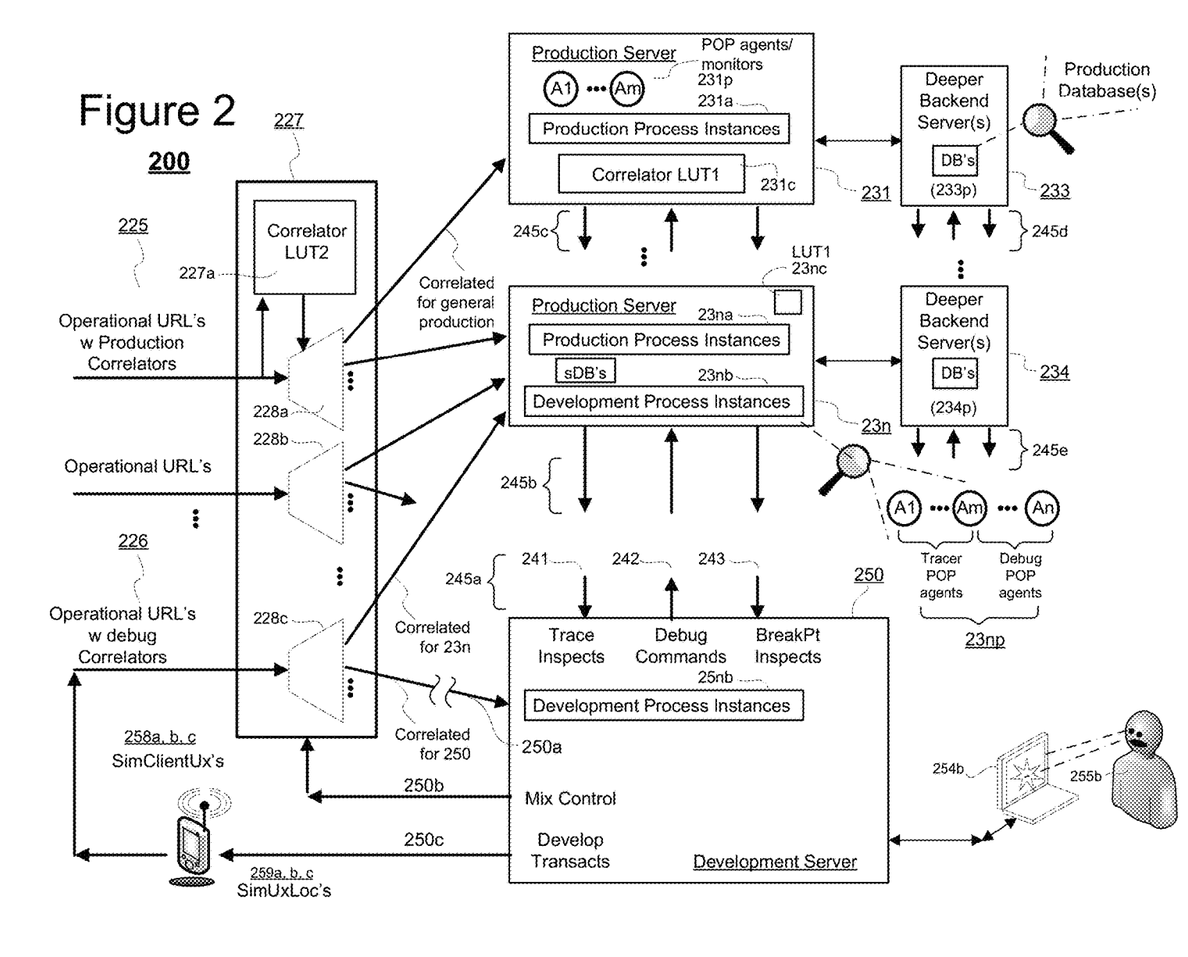
FIG. 2 is a schematic diagram depicting a modified traffic distributor (e.g., load balancer) that routes a predetermined amount of live production traffic into a real or virtual server that also has development and being-debugged software instances running in it.

Referring now to FIG. 2, shown is an embodiment portion 200 of the system 100 including a modified dynamic load balancer 227. Generally, dynamic load balancers are designed to automatically and smoothly distribute service requesting traffic streams to different ones of local, service providing servers (e.g., 231) such that no one server (e.g., 231) is overwhelmed with service requests and such that, at the same time, efficient use is made of available local resources (e.g., filling them up to their optimal task processing capacities). To this end, the load balancer 227 may include a plurality of multiplexers, 228a, 228b, . . . , 228c; that operate in accordance with an appropriate and automated prioritization scheme that seeks to evenly but optimizing wise distribute received traffic streams 225 to local production servers 231, 232 (latter not shown), . . . , 23n based on available spare capacity (e.g., just freed up capacity) in each of these local production servers and optionally based on quality of service (QoS) demands embedded in various ones of the received service requests 225. If the number of production servers 231, 232 (latter not shown), . . . , 23n currently assigned to the local load balancer 227 is not large enough, the local load balancer may automatically request that additional resources be allocated to it and/or that part of the received traffic 225 be diverted at an upstream location to another load balancer that does have sufficient spare capacity allocated to its servers.

In accordance with the present disclosure, the dynamic load balancer 227 of FIG. 2 is modified to be responsive to a mix control signal 250b which dictates that certain types of incoming traffic 226 should be routed to a preassigned one or more of the servers (in this case only to the exemplary production server denoted as 23n) and that specified amounts or proportions of general incoming traffic 225 should also be respectively routed to respective ones of the preassigned one or more of the servers (in this exemplary case only 23n) so that these one or more preassigned servers are subject to load demands specified by the mix control signal 250b rather than being subject to load demands dictated by the general load distribution algorithms otherwise executed by the modified load balancer 227. In one embodiment, the designation by the mix control signal 250b of one or more of the production servers (e.g., 23n) as being preassigned to receive a mix of development process instances and production process instances also designates those servers (real or virtual) as being non-deallocatable by the load balancing algorithms of the modified load balancer 227. In other words, even if used rules for maintaining efficiency of resource utilization indicate that a preassigned production server (e.g., 23n) is to be removed from the list of production servers allocated to load balancer 227, that rule is ignored so that the preassigned production server (e.g., 23n) containing development process instances 23nb remains allocated and accessible for routing simulated transaction sessions 250c by way of the load balancer 227 into that preassigned production server (e.g., 23n).

Preassigned servers such as 23n are instrumented to include not only performance monitoring POP agents A1-Am (tracer agents) and/or other monitoring means, but also live debug agents A(m+1)-An and/or other debugging tools where the latter are operatively coupled to so-called, development process instances of executable threads 23nb within the preassigned servers for setting and reporting on breakpoint and/or other code debugging results occurring for the development process instances 23nb. At the same time, production process instances of executing threads 23na continue to run in the preassigned servers (e.g., 23n) such that the supporting operating system (OS) and/or Hypervisor of the preassigned servers and their respective hardware resources (not shown) are subject to the demand loadings of the production process instances 23na at the same time that the development process instances 23nb are run under debug control. By varying the mix (using mix control 250b) of production process instances 23na and development process instances 23nb executing simultaneously within a given real or virtual server 23n, an SaaS developer 255b can determine if the under-development process instances 23nb interfere with the current mix of production process instances 23na and/or vice versa and/or if the under-development process instances 23nb are incompatible with the library functions added to them during dynamic link/load time. At least the production process instances 23na of the mix receiving server 23n are monitored by embedded tracer POP agents (A1-Am) and/or other performance monitoring means so that changes to their performance can be observed as a function of simultaneously executing the under-development process instances 23nb.

In one embodiment, transaction session traffic 226 that is to be specially routed by the modified load balancer 227 to a respective one or more, specially assigned servers (e.g., 23n) has embedded therein, so-called development correlator tokens which correlate (e.g., by use of the local tokens correlating LUT2 227a) the specially routed traffic 226 with their debug-instrumented servers (e.g., 23n). The development correlators may, in the form of unique tokens created when debug transactions 250c are launched. Alternatively or additionally, the specially routed traffic 226 may include specially marked development URLs, for example: Amazem.com/PurchaseBooks/newDebug23n/AppleiOSServices.js which due to the special marking, will be distinct from normal operational URLs (e.g., Amazem.com/PurchaseBooks/AppleiOSServices.js). In one class of embodiments, different ones of operational transaction requests may be marked with their own distinct correlator tokens and/or operational-indicating URLs so as to distinguish them from the tokens/URL's of the under-development processes (e.g., those launched via path 250c). In either case, the modified load balancer 227 is configured to discriminate amongst the different correlator tokens and/or URL's and to normally route traffic having operational correlators/URL's to general purpose production servers such as 231 while specially routing traffic having the development correlators 226 (and/or development indicating URL's) to correspondingly assigned servers (e.g., 23n) that have the debug agents (A(m+1)-An) and/or other debug enabling means installed in them. One further class of correlator tokens and/or URL's may cause certain ones of inputted service requests (250a) to be routed back by way of the network communication fabric(s) (represented by the break in the connecting line of 250a) back to the development server 250 from which they were launched to thereby test the integrity of the network communication fabric(s) and the operability of the modified load balancer 227 (and/or of its included LUT2, a.k.a. 227a).

In one embodiment, the SaaS control section server 250 outputs instrumented development transaction requests 250c to the load balancer 227 by way of one or more simulated client devices 258a, 258b, 258c, . . . (also denoted as SimClientUx's) where the respective simulated client devices may optionally have simulated remote locations 259a, 259b, 259c, . . . (also denoted as SimUxLoc's) so as to enable investigation of transaction sessions which are responsive to reported client device locations. Additionally or alternatively, the SaaS control section server 250 may have remote access to actual client devices at actual client locations (e.g., 110 at LocU1 of FIG. 1) due to special instrumentation of those actual client devices, where the special instrumentation causes transaction sessions from those actual devices to specify development (e.g., to include development correlator tokens and/or special URL destinations) as opposed to specifying normal operational tokens and/or destination specifying URLs. In this way, the developer 255b can investigate and debug transaction code which uses the actual communications network (e.g., 115, 125 of FIG. 1) as opposed to bypassing the actual communications network and routing transaction traffic 226 from the simulated client devices 258*a,b,c* directly into the modified load balancer 227.

As further indicated in FIG. 2, in one embodiment, the mix control signal 250*b* output by the development server 250 can configure the load balancer 227 (and more specifically, in one embodiment, its included LUT2 227*a*) to specially route some of the development process instances 25*nb* back to the development server 250 so that these instrumented instances 25*nb* can be locally debugged from within the development server 250.

For the case of the remote development instances (e.g., 23*nb*), the development server 250 is provided with interfaces such as 245*a* which allow for execution thread trace inspections (241), outputting of debug commands (242) an inspection of breakpoint results (243) for the remotely executing instances (e.g., 23*nb*). The remote production servers (e.g., 23*n*) are configured to have remotely addressable, counterpart interfaces such as 245*b*, 245*c*, 245*c*, 245*d*, 245*e*, etc. whereby the development server 250 can use its inspection and command interfaces 245*a* to address and access those remotely addressable counterpart interfaces, 245*b*-245*e*. Although FIG. 2 indicates the case where development server interface 245*a* is addressably coupled to counterpart interface 245*b*, the development server 250 can be configured to remotely access the counterpart interfaces of deeper backend servers such as 233 and 234 rather than being limited to a specific task-delegation section within the cloud or Internet. Accordingly the debugging analyst 255*b* (and his utilized data processing equipment 254*b*) may have access to traffic flow in various front end, middle and deep end parts of the system for the purpose of debugging code under live transaction conditions.

To summarize part of what has been disclosed thus far, a system has been provided that comprises: (1) a load balancer 227 with mix controller 250*b*, (2) one or more production app server(s) 231-23*n* where at least one is instrumented to call in at dynamic link/load time custom class loaders that enable correlator-based tracing (similar to automated production monitoring or APM instrumentation), (3) deeper back end infrastructure (233-234) instrumented with similar transaction tracers and (4) at least one development server 250 where both application servers (e.g., 231-23*n*) and the development server 250 can forward delegated transactions to deeper ones of the back end infrastructure.

Developer run troubleshooting and debugging tools (e.g., debug code) executing in developer machines (e.g., 254*b*) interact with development server 250. This allows the troubleshooting and debugging tools to obtain tracing and profiling data from production servers (e.g., 23*n*) that are subject to live traffic load while controlling the mix of load and under development instances via the Mix Controller 250*b*. The Load Balancer 227 receives incoming load including those having the Production Ops URLs and those having the development correlator tokens and distributes the incoming traffic to one or more of the Production Servers in accordance with the URL's and/or their respectively embedded correlators. In one embodiment, the incoming Load is pre-instrumented by the Mix Controller with at least two type of correlators—Development correlator and Operations correlator. The Development correlator token allows the instrumented application server (23*n*) to stop execution of bytecode on a breakpoint set by the Developer via the Development Server 250, permits collection of tracing data and transaction traces via the debug interfaces (e.g., 245*a*, 245*b*). In one embodiment, embedded Operations correlators only permit access to performance traces and transaction traces of their respective process instances. By controlling the mix, a Developer 255*b* can create instances of Operations Processes with respective development correlator tokens attached to them, load same tokens and desired attributes into the LUT1 and LUT2 lookup tables and thus take full control of those instances, stop them on breakpoints, resume them at will etc. By directing production workload with operations correlator to development instances, the Developer can profile and trace transactions of live transactions serving customers. The Load Balancer can direct incoming requests on present for a given Operations URL to the Development server due to the embedded tokens and can configure the load balancer so that the mix-receiving server (23*n*) is a dynamically non-removable, allocated extra resource (e.g., allocated by a system supervisor not shown) needed for compensating for performance penalties of processing bandwidth due to tracing and profiling of the under development instances 23*nb*.

During execution, the debug enabling POP agents and/or other debug enabling means of the preassigned production servers (e.g., 23*n*) automatically detect the development correlator passed through or added (see step 419 of FIG. 4) by the Load Balancer 227 as part of the under-debug transaction instance. When a breakpoint and/or other debugging event occurs, the debugging POP agents (e.g., (A(m+1)-An)) and/or other remote debug enabling means may signal the development server 250 of the detection of the debugging event and the identity of the instance by passing the same correlator token to the debugging tools (not explicitly shown) in the development server 250 via the interaction interface channel 245*a*/245*b* established between the production server (e.g., 23*n*) and the corresponding development server 250. The development server 250 can thereafter embed that same correlator into with any of consecutive service requests 250*c* so that a trace can be developed for all transactions associated with the first service requests 250*c* to have that unique correlator token assigned to it. When the Load Balancer receives a request 250*c* that already has a unique correlator assigned to it, the Load Balancer 227 can first check if the debugger correlator is present in its LUT2 and if it is present, then the Load Balancer 227 can automatically direct the pre-correlated request 250*c* to the appropriate production server (e.g., 23*n*) for further processing under control of the debug POP agents and/or other remote debug enabling means. If a correlator is not present in a received request having an Operational URL (225) associated with it, then in one embodiment, the Load Balancer 227 automatically creates a new and unique correlator and also creates custom class loaders for passing the unique correlator back to the corresponding development server 250 if needed where the default token type is a production type (see step 419 of FIG. 4) but optionally where the balancer created token may be another type.

In cases where the under development instances 23*nb* interact with database records and thus there is a risk that a person debugging a live application might deliberately or by mistake alter critical data kept in a production database (DB) used by the being debugged application, then the bytecode instrumentation for that case is configured to either (1) redirect all database interactions to a simulated database (sDB) rather than to a production one, or (2) to attach special markers to the data originated in the debug session so that it could be purged or discarded at later time from the production database(s) (DB's).

Technology for creating simulated databases (sDB's) is known to those skilled in the art. In one embodiment, if the route of using simulated databases (sDB's) is taken, then read requests are sent to the real production DB, but requests for table locking, writes and updates, are sent only to the corresponding simulated database (sDB). A side benefit of this solution is that real production DB is not touched by the debug code and thus there is no issue of data contamination.

It is to be understood that the present disclosure includes an approach that isolates one or more slices (e.g., 23n) of the production environment so that debugging can be done within live production environment and real production load can be profiled and traced in development infrastructure.

Figure 3:
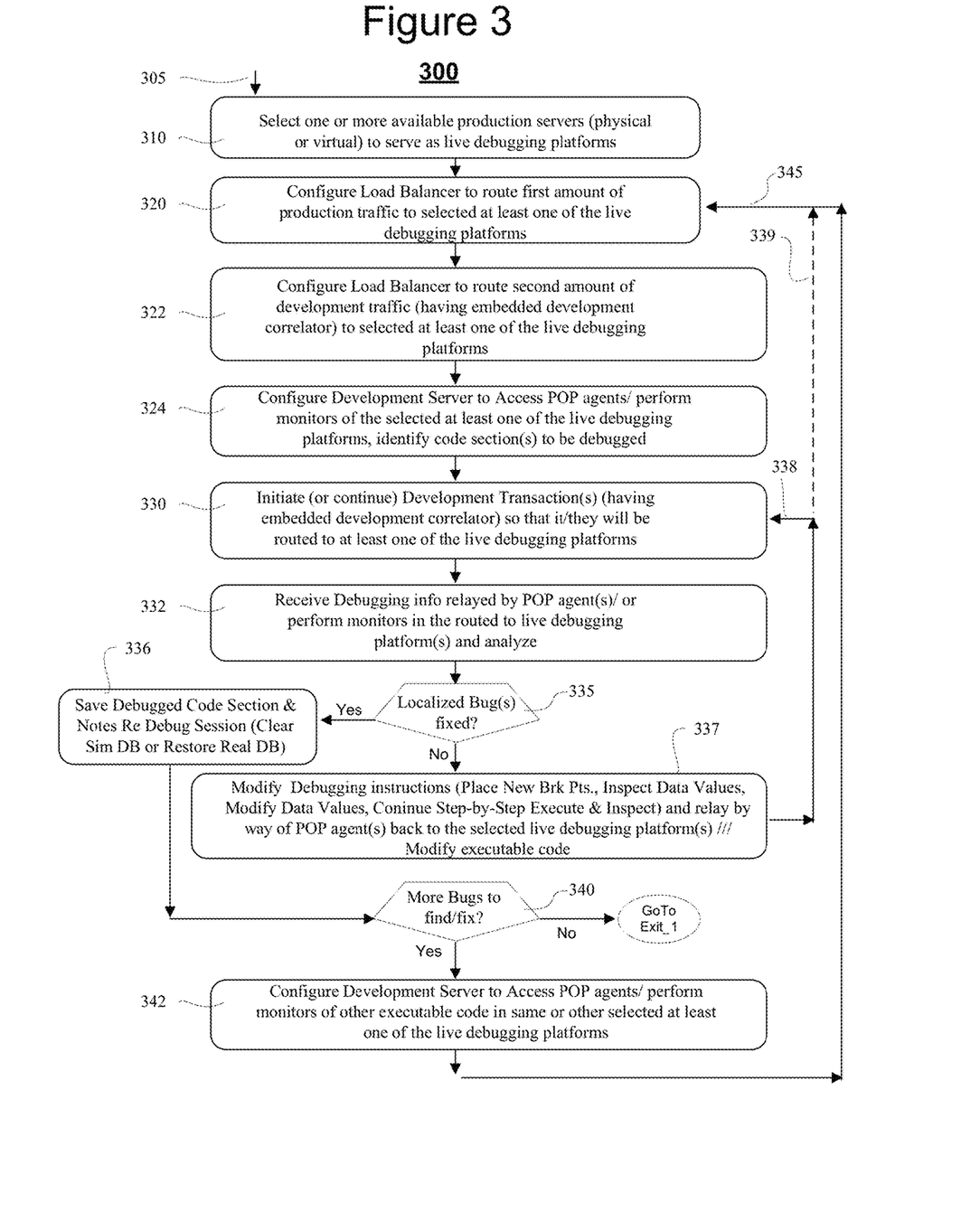
FIG. 3 is a flow chart depicting a method of debugging live production code in different sections of the in-cloud distributed system.

Referring to FIG. 3, shown is a method 300 in accordance with the present disclosure. Entry may be made at 305. In step 310 one or more of available production servers are designated as live debugging platforms associated with a corresponding load balancer and specified tokens within the LUT2 of that balancer 227. New or recently modified executable codes (and link loadable remote debugging functions) are understood to have already been installed in appropriate code holding sections (e.g., 13n.2 of FIG. 1) of the available production servers (e.g., server 13n of FIG. 1) that have been designated as live debugging platforms. At step 320 the corresponding load balancer that selectively routes traffic to a group of production servers including the one or more live debugging platforms is configured to route a first amount of live production traffic to at least one of the designated live debugging platforms associated with it. In one embodiment, the routing is initially based on embedded correlator tokens found within the live production traffic.

At step 322 the corresponding load balancer is configured to also route a second amount of traffic to the at least one of the designated live debugging platforms where that second amount of traffic is designated as under development traffic. In one embodiment, the routing is initially based on embedded development tokens found within the development traffic and then, later on unique new development correlator tokens that may be dynamically assigned (for example by the developer). (See for example, session initiation signals 250c sent by the development server in FIG. 2 to simulated client devices 259a,b, . . . )

At step 324, the development server is configured to address and access debugging POP agents and/or other debug enabling software and/or hardware of a designated production server (e.g., 23n) that is designated to receive a mix of live production traffic and development traffic. The designated development server may reside in a predetermined slice of the networked enterprise system. The specific code sections (e.g., inside 13n.2) that are to be debugged may be identified by the unique development correlator tokens assigned to those code sections.

At step 330 the development server initiates or continues one or more, being debugged development transactions by way of simulated (or in one embodiment, commandeered real) client devices where the initiation of such transactions may include attaching development-indicating tokens to those transaction initiating or continuing requests. When the load balancer receives for a first time a transaction request having a development-indicating token it routes it accordingly. If the load balancer receives for a first time a transaction request having an operational URL but no corresponding correlator, the load balancer automatically creates or assigns a unique correlator token to that initiated transaction where the default is an operational token. As the development server steps forward through the debugging controlled steps of each of its under-development processes (e.g., those having pre-set breakpoints), the development server returns the pre-assigned correlators of those development transactions to the development server. In response, the development server recognizes the unique development correlator and routes further corresponding transaction signals by way of the load balancer to the same production server (e.g., 23n of FIG. 2) in which servicing of the initial transaction request began.

At step 332 the development server received by way of its interface to the designated production server, debugging information relayed by the POP debugging agents and/or other remote debug enabling means of that designated production server (e.g., 23n). The received debugging information may include any one or others of debugging related items of data including but not limited to, trace reports indicating the flow of execution through code portions of the under-development application executing in the designated production server (e.g., 23n); breakpoint reports indicating where and/or why an execution break occurred and what the status of the application was at the time of the break; transaction status reports indicating the states of ongoing instances of development transactions; and so on. The received reports are analyzed automatically and/or manually by way of the development server.

At step 335 it is determined by way of analysis whether a being debugged code section actually has bugs and if the most recent installation of the correlator identified code section has fixed a previous set of one or more bugs based on the received reports. If the answer is no, the one or more bugs still exist or they have not yet been fixed or new bugs have cropped up then control passes to step 337 where at the current debugging instructions are modified and the changes are relayed by way of the debugging POP agents or other debug enabling means back to the corresponding live debugging platform (e.g., 23n) while at the same time the corresponding transaction is either continued or re-initiated by way of its simulated client device (e.g., 258a). The modification of the current debugging instructions in step 337 may include resetting old breakpoints and/or placing new breakpoints in one or more of the threads, waiting for the breakpoints to next trip (e.g., detecting that they have tripped), inspecting data values present after the breakpoints have tripped, modifying data values to see how those affect execution behavior, optionally stepping through use of the code by an instantiated thread step by step or letting the thread execute through to a next breakpoint and so on. If the debugging process indicates that the code needs to be modified, then the process is repeated by installing the modified code into the corresponding debugging platform (e.g., 23n), again instantiating one or more execution threads that use the code, checking for execution stops/pauses at preset breakpoints, inspecting machine states at those breakpoints and so on. Thus the present disclosure provides methods for deploying new or changed code in live production environments, directing different amounts of production loads (by use to the controllable load balancer 227) to respective servers having that new or changed code installed in them and then running debugging sessions on the new/changed code processes while the respective servers are subject to varied amounts of live production loads. Each time modified code is installed into one of the debugging platforms, control is passed to step 320 by way of paths 339 and 345 the appropriate mix of production load and development traffic may be selected and re-initiation of the corresponding transactions may occur. On the other hand, if new/modified code is not being installed and instead an ongoing debugging session is being continued then control passes to step 330 (by way of path 338) for continuation of the under development transaction, this being followed by steps 332, 335 and 337.

If the answer to test step 335 is Yes, the localized bugs have been identified and determined to have been fixed, then control passes to test step 340 in which it is determined whether there are more bugs to find and/or fix in other sections of the enterprise system 100. If the answer to test step 340 is no, then the method 300 is exited. On the other hand, if the answer is yes then control passes to step 342 in which the development server is configured to access the debugging POP agents of the identified other sections of the enterprise system 100 where each of those identified other sections is configured to have at least one live debugging platform and corresponding load balancer structured in a manner similar to that described above for the case of FIG. 2. Control path 345 is then taken back up to step 320 where the load balancer of the new, under development section of the enterprise system is configured to route part of its life production traffic to a live debugging platform (e.g., like server 23n described above).

Figure 4:
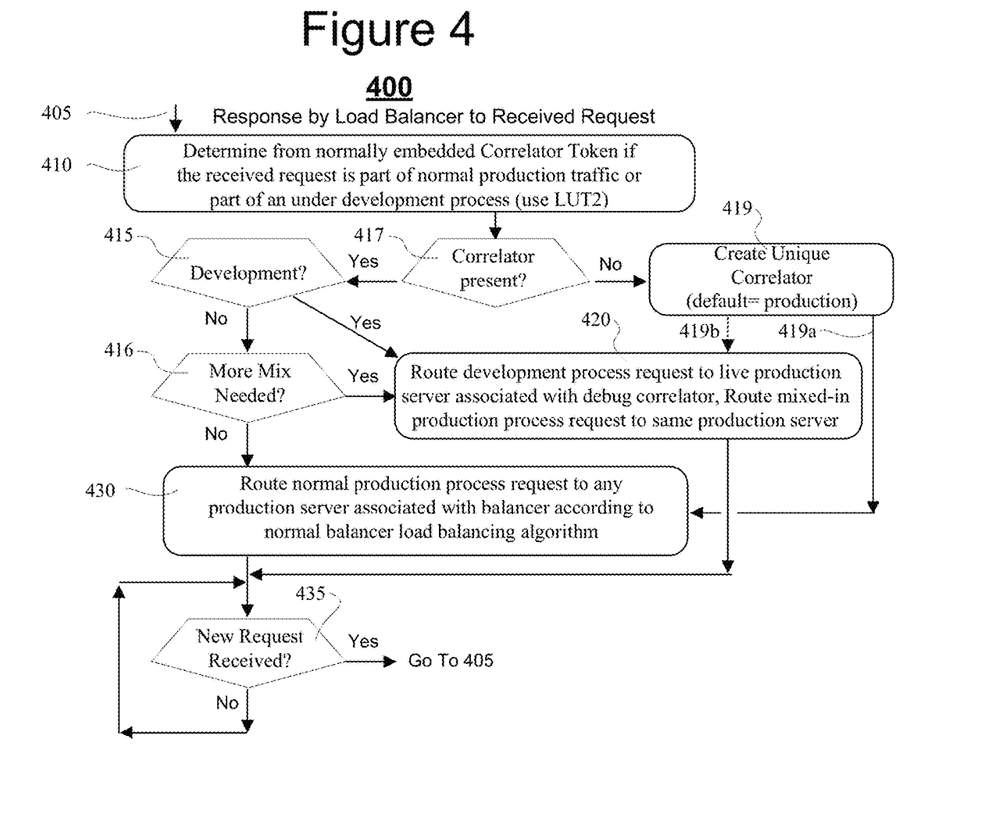
FIG. 4 is a flow chart depicting an automated process for correlating transaction requests of under-development processes with their respective transactions in corresponding production servers.

Referring to the flow chart of FIG. 4, shown is an embodiment 400 of a method that can be carried out within a load balancer in accordance with the present disclosure. Entry is made at 405 in response to receipt of a new request for routing by the load balancer of the received transaction request. At step 410 it is determined from an embedded URL and/or an embedded correlator token of the received request whether the received request is part of normal production traffic or part of an under-development process. In the case of already correlator tokens the data in the corresponding LUT2 of the load balancer may be accessed to thereby automatically determine how to handle the received request package.

If at steps 417 and 415 it is determined based on the embedded token or special URL that yes, it is a request belonging to an under-development transaction, then control passes to step 420. If the answer is no, there is not yet a corresponding correlator, then at step 419 a new and unique correlator is generated for the corresponding transaction and associated therewith as well as with a designated production server to which the development transaction will be routed. The default token type is that for a normal production process. However, in one embodiment, the developer may take over control of step 419 and cause it to create a different type of correlator token as well as storing the created token in the corresponding LUT1 and LUT2 lookup tables. Then at respective steps 420 and 430 the development process request is routed by the load balancer to the live production server associated with the correlator token.

If the answer at test step 417 had been yes, a correlator already exists and it is for normal production handling, then nonetheless at step 416 it is determined whether additional normal production traffic is needed by a respective mix receiving server (e.g., 23n). If the answer at test step 416 is no, the received request is for normal production traffic and no additional mix is needed, then control is passed to step 430 for normal load balancer routing. On the other hand, if in step 416 it is determined that any one or more of the live development platforms (e.g., 23n) currently needs an addition to its mix of normal production traffic, then at step 420 the normal production traffic is routed to the appropriate production server requesting that additional mix.

At step 435 the process waits for receipt of a next new request to the load balancer. If such a next new request is detected, control passes to the top of the process at entry point 405.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Java Applets, JavaScript, AvtiveX, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope include that defined by the claims appended hereto.

What is claimed is:

1. A machine-implemented method of developing operative code in a live production loaded environment that includes recordation of transactions, the developing method comprising:
    marking development-related communications so as to distinguish the development-related communications from live production-related communications;
    distributing the live production-related communications and the marked development-related communications to one or more servers of said live production loaded environment, where the one or more servers have instantiated in them, first code for handling production process instances and second code for handling development process instances, wherein transaction requests of the live production-related communications are routed for handling by the first code and transaction requests of the marked development-related communications are routed for handling by the second code; and
    recording outcomes from the handling of the transaction requests of the marked development-related communications and from the handling of the transaction requests of the live production-related communications, the recording being responsive to presence and absence of the markings that distinguish the development-related communications from the live production-related communications.

2. The method of claim 1 wherein said marking of the development-related communications includes attaching development-indicating tokens to the development-related communications.

3. The method of claim 1 wherein said marking of the development-related communications includes assigning unique destination addresses to the development-related communications the unique destination addresses being usable for distinguishing the development-related communications form the live production-related communications.

4. The method of claim 1 wherein the second code includes debugging code.

5. The method of claim 1 wherein said responsiveness of the outcomes recording includes recording outcomes from the handling of the transaction requests of the marked development-related communications in a simulated database rather than in a live production database.

6. The method of claim 1 wherein said responsiveness of the outcomes recording includes recording outcomes from the handling of the transaction requests of the marked development-related communications in a live production database and in a manner that the recorded outcomes from handling of the marked development-related communications can be distinguished from recorded outcomes of handling the live production-related communications.

7. The method of claim 6 and further comprising:
purging from the live production database the recorded outcomes from handling of the marked development-related communications.

8. The method of claim 1 wherein correlator lookup tables (LUTs) are provided in at least those of the servers to which the marked development-related communications can be distributed, the correlator LUTs enabling the servers to internally distinguish contents of the marked development-related communications from contents of the live production-related communications.

9. The method of claim 8 wherein the handling of the development process instances within the servers includes loading debug supporting library functions provided within the servers when instantiating the code for handling the development process instances.

10. The method of claim 8 wherein the instantiated code for handling the development process instances includes reporting code configured to report at least one of prespecified execution thread trace inspections, breakpoint encounters and development transaction status to a development server.

11. The method of claim 8 wherein the instantiated code for handling the development process instances includes reconfiguration code enabling reconfiguration of debugging operations within one or more of the servers in response to debugging commands sent by the development server.

12. The method of claim 1 and further comprising:
initiating development transactions by routing simulated transaction sessions through simulated client terminals which produce the marked development-related communications.

13. The method of claim 12 and further comprising:
passing the produced marked development-related communications through a dynamic load balancer which is responsive to markings of the development-related communications when distributing communications to respective servers within the live production loaded environment.

14. The method of claim 1 and further comprising:
determining effects on performance of the handling of the production process instances due to concurrent handling of the development process instances; and
determining effects on performance of the handling of the development process instances due to concurrent handling of the production process instances.

15. A networked system comprising:
interconnected servers and traffic distributors adapted for handling live production-related communications used for carrying out live production transactions;
a development server configured to generate and mark transaction sessions for use in debugging under-development software, the marking being usable for distinguishing development-related communications from the live production-related communications, the development server being configured to cause routing to at least one of the servers that handles live production-related communications, one or more of development-related communications containing respective and marked transaction session requests for concurrent handling by the at least one of the servers; and
storage for recording therein outcomes of handling of the live production-related communications and of the development-related communications, the storage being configured to distinguish between recordings therein of outcomes of the handling of the live production-related communications and of outcomes of the handling of the development-related communications.

16. The system of claim 15 wherein:
said marking of the generated transaction sessions includes attaching development-indicating tokens for inclusion in the development-related communications.

17. The system of claim 15 wherein:
said marking of the generated transaction sessions includes assigning unique destination addresses for inclusion in the development-related communications, the unique destination addresses being usable for distinguishing the development-related communications form the live production-related communications.

18. The system of claim 15 wherein:
said storage includes a simulated database and a live production database; and
outcomes from handling of the development-related communications are stored in the simulated database while outcomes from the handling of the live production-related communications are stored in the live production database.

19. A non-transitory computer readable medium for use in a networked system having interconnected servers and traffic distributors adapted for handling live production-related communications used for carrying out live production transactions, the medium storing instructions for causing a carrying out within the networked system of an automated method for developing operative code while the code is executed in a live production loaded environment of the networked system, where the system records transactions carried out within the system, the developing method comprising:
marking development-related communications so as to distinguish the development-related communications from live production-related communications;
distributing the live production-related communications and the marked development-related communications to one or more servers of said live production loaded environment, where the one or more servers have instantiated in them, first code for handling production process instances and second code for handling development process instances, wherein transaction requests of the live production-related communications are routed for handling by the first code and transaction requests of the marked development-related communications are routed for handling by the second code; and
recording outcomes from the handling of the transaction requests of the marked development-related communications and from the handling of the transaction requests of the live production-related communications, the recording being responsive to presence and absence of the markings that distinguish the development-related communications from the live production-related communications.

20. The medium of claim 19 wherein said marking of the development-related communications includes attaching development-indicating tokens to the development-related communications.

* * * * *